April 21, 1931.  W. MacKIRDY  1,801,633
PRIME MOVER
Filed Jan. 9, 1928     2 Sheets-Sheet 1
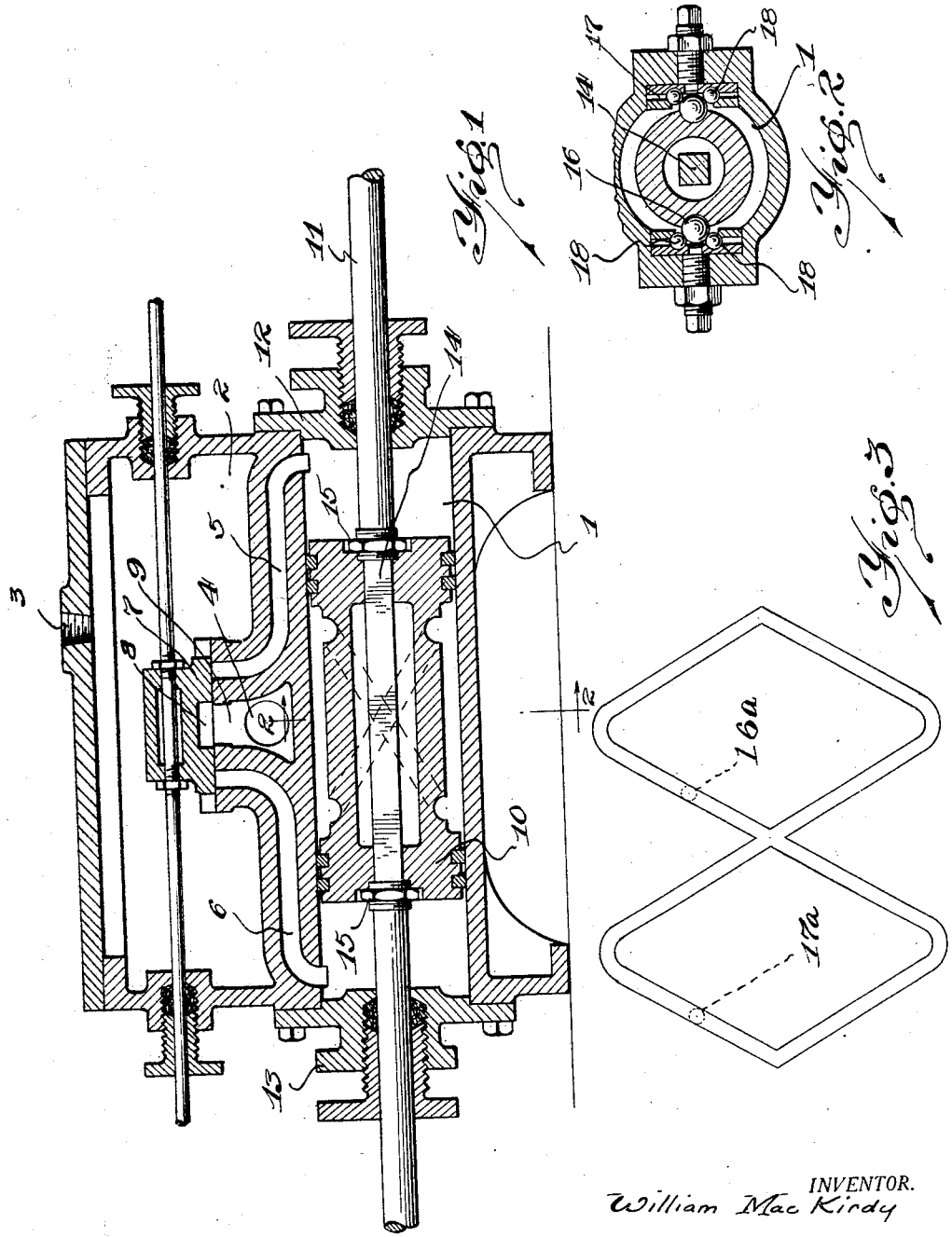
INVENTOR.
William Mac Kirdy
BY
ATTORNEY.

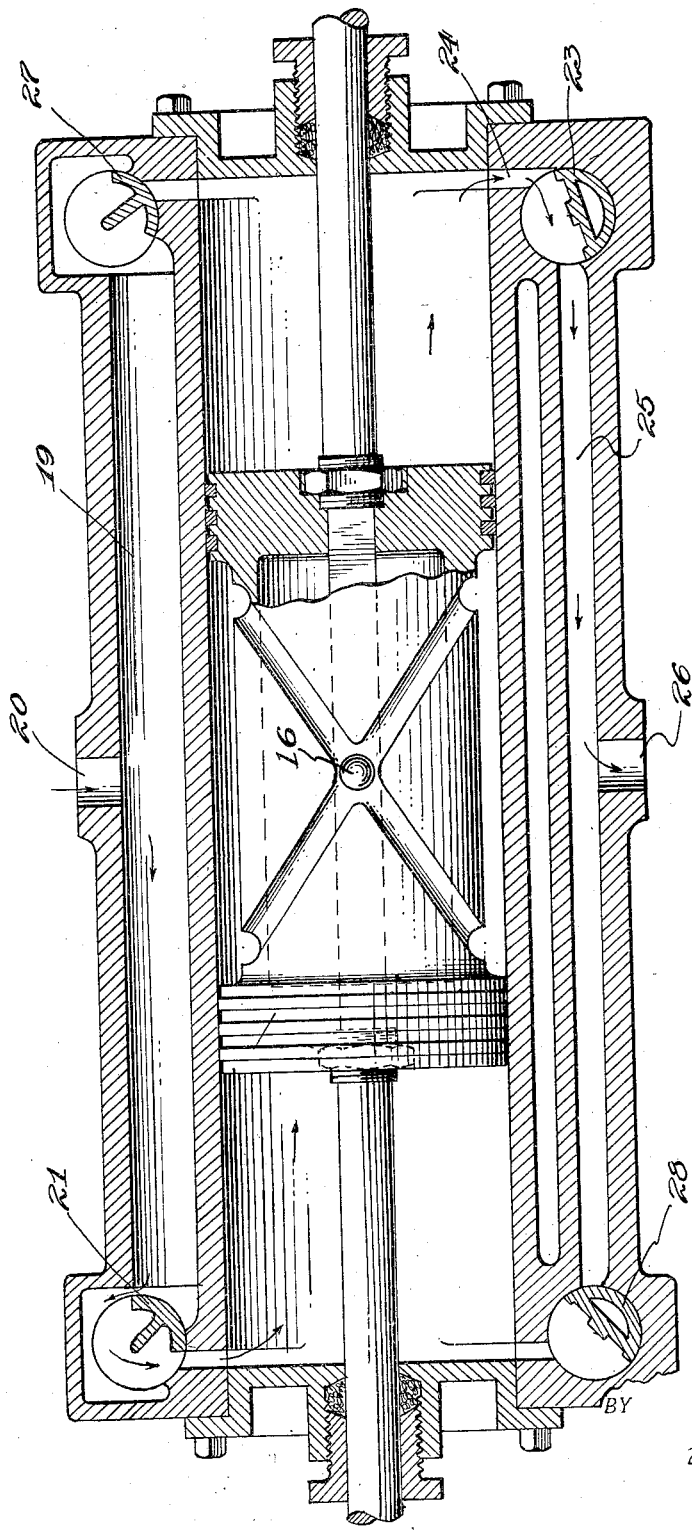

Patented Apr. 21, 1931

1,801,633

UNITED STATES PATENT OFFICE

WILLIAM MacKIRDY, OF VANCOUVER, BRITISH COLUMBIA, CANADA

PRIME MOVER

Application filed January 9, 1928. Serial No. 245,402.

This invention relates to prime movers and the object of the invention is to provide a prime mover operated by an expandible fluid and arranged to convert reciprocating movement into rotary movement.

One of the particular objects of the invention is to provide a simple and efficient arrangement for converting reciprocating movement of a piston directly into rotary movement.

Another object of the invention is to provide a means for rotating the piston during its reciprocation, a shaft being secured to the piston and movable therewith.

These objects and the several novel features of the invention are hereinafter more fully described and claimed and the preferred form of construction by which these objects are attained is shown in the accompanying drawings in which—

Fig. 1 is a section through a prime mover embodying my invention and equipped with a slide valve.

Fig. 2 is a section taken on line 2—2 of Fig. 1.

Fig. 3 is a diagrammatic development of the ball grooves in the cylindrical surface of the piston.

Fig. 4 is a section through a prime mover equipped with rotary valves.

In the form shown in Fig. 1 the device comprises a cylinder 1 having a pressure chamber 2 immediately thereover. This pressure chamber is provided with an inlet 3 and an outlet 4 is provided through which the fluid is discharged from the cylinder. Two conduits 5 and 6 are provided leading to opposite ends of the cylinder 1 and a slide valve 7 is provided adapted to connect either conduit with the exhaust chamber. This is accomplished by means of the chamber 8 in the slide valve. Upon movement of the slide valve to the left the chamber 8 connects the conduit 6 with the exhaust chamber 9 leading to the exhaust port 4 and at the same time the slide valve 7 opens the conduit 5 to the pressure chamber 2. Upon subsequent movement of the slide valve to the right it opens the conduit 6 to the pressure chamber 2 and the chamber 8 on the slide valve connects the conduit 5 with the exhaust chamber 9. This slide valve 7 is of the usual type and is operated automatically in timed relation with the reciprocating movement of the piston 10. A shaft 11 is rotatably mounted in the cylinder heads 12 and 13 and is provided with stuffing boxes, as shown, to prevent leakage of the expandible fluid. The portion 14 of the shaft 11 within the cylinder 1 is square as will be understood from Figs. 1 and 2 and the piston is provided with square apertures in each end fitting the squared portion 14 of the shaft. The shaft is provided with a nut 15 at each end of the piston which engages the piston and secures the shaft to the piston. A pair of balls 16 and 17 are mounted diametrically opposite in the walls of the cylinder 1 on adjustable thrust bearings 18. These balls ride in angularly extending grooves provided therefor in the outer cylindrical surface of the piston as indicated in dotted lines in Fig. 1 and a development of these grooves is shown in Fig. 3. The balls are held in stationary position in engagement in the grooves and as the grooves extend at an angle, longitudinal movement of the piston causes the piston to turn on its longitudinal axis. As the balls reach the upper ends of their respective grooves the piston is stopped by movement of the slide valve and is then driven in the opposite direction causing the balls to continue to travel through the angular grooves and turn the piston. In the development shown in Fig. 3 the position of the two balls is indicated by dotted lines 16a and 17a. In this figure it will be seen that downward movement of the piston will turn the piston to the left as the angle of both grooves is the same. As the piston moves to the end of its stroke the two balls travel to the top of the grooves at which point the slide valve is operated to start the piston on its movement in the opposite direction. To overcome the possibility of the balls remaining at dead center at the top of the piston groove the shaft 11 is preferably provided with a fly wheel in order to keep the piston revolving, though there is very little chance of the piston stopping with the balls at absolute dead center.

As the piston moves in the opposite direction the balls travel to the opposite end of the grooves and this continued movement of the piston is a combined reciprocating and rotary movement which moves the shaft therewith. Any approved means may be employed for delivery of power from this reciprocating and rotating shaft such for instance as disclosed in the U. S. patent to Wheeler No. 412,217 of October 1, 1889. While the grooves may be in the form shown in Fig. 3 in which the piston is given one-half a revolution in one stroke or a complete revolution in a complete cycle of two strokes, a greater number of grooves may be provided in which the angle of the grooves is more nearly parallel to the longitudinal axis of the piston and these grooves may be so designed that it takes four or more strokes of the piston to produce a complete revolution thereof. By this arrangement a speed reduction may be obtained by making interchangeable pistons having different numbers of grooves and a larger number of balls may be used if desired in this type of construction. The balls 16 and 17, as shown in Fig. 2, are mounted in thrust bearings so that they are freely rotatable at all times in order to reduce the friction of the balls in the piston grooves.

In the form shown in Fig. 4 the parts are practically the same as in Fig. 1 with the exception that the expandible fluid is admitted and exhausted by rotary or Corliss type valves. In this case a pressure chamber 19 is provided having an inlet 20 and the expandible fluid passes around the inlet valve 21 and through the conduit 22 into the cylinder to move the piston to the right of Fig. 4. At the same time the exhaust valve 23 is open and the exhaust fluid passes through the conduit 24 and around the valve 23 into the exhaust chamber 25 from which it passes through the outlet 26 as will be understood from the arrows in the said figure. As the piston reaches the right end of the cylinder the valves 21 and 23 are closed and the valves 27 and 28 are opened to move the piston in the opposite direction as will be readily understood. By stopping the piston intermediate the ends of its stroke and moving it in the opposite direction the piston may be made to rotate in the reverse direction. This is true of either form and may be accomplished by control of the inlet and exhaust valves.

From the foregoing description it becomes evident that the device is very simple and efficient in operation, will not easily get out of order, provides a prime mover in which reciprocating movement is converted directly into rotary movement and provides a device which accomplishes the objects described.

Having thus fully described my invention, its utility and mode of operation, what I claim and desire to secure by Letters Patent of the United States is—

1. In a prime mover, a cylinder, a piston reciprocable longitudinally in the cylinder, means for admitting an expandible fluid alternately into either end of the cylinder to reciprocate the piston, a pair of thrust bearings mounted in the cylinder wall on diametrically opposite sides of the piston, a ball rotatably mounted in each thrust bearing, the piston being provided with continuous grooves in its outer surface in which the balls engage, a shaft on which the piston is fixed in position and extending through the cylinder, the portion of the shaft within the cylinder being square and the piston being provided with square apertures engaging the square portion of the shaft, the grooves in the piston being so arranged that reciprocation of the piston rotates the piston and shaft.

2. In a prime mover, a cylinder, a piston reciprocable longitudinally in the cylinder, means for admitting an expandible fluid alternately through either end of the cylinder to reciprocate the piston, a series of balls supported in the cylinder wall, the piston being provided with grooves in which the balls are adapted to travel, the grooves being so arranged as to rotate the piston during reciprocation thereof, and a shaft extending through each of the opposite ends of the piston and on which the piston is fixed in position.

3. In a prime mover, a cylinder, a piston reciprocable in the cylinder, means for admitting an expandible fluid alternately into either end of the cylinder to reciprocate the piston, a ball rotatably mounted in stationary position in the cylinder wall, the piston being provided with a continuous groove in which the ball engages and arranged to rotate the piston during reciprocation thereof, a ball thrust bearing supporting the said rotatable ball, and a shaft extending through opposite ends of the cylinder and on which the piston is fixed in position.

In testimony whereof I sign this specification.

WILLIAM MacKIRDY.